Jan. 5, 1971  B. D. MOORE  3,552,059

CUT FLOWER PACKAGE

Filed Dec. 7, 1967

INVENTOR.
BURT D. MOORE

BY

HIS ATTORNEYS

United States Patent Office 3,552,059
Patented Jan. 5, 1971

3,552,059
CUT FLOWER PACKAGE
Burt D. Moore, Dayton, Ohio, assignor to Moore Paper Boxes, Incorporated, Dayton, Ohio, a corporation of Ohio
Filed Dec. 7, 1967, Ser. No. 688,817
Int. Cl. A47g 7/02
U.S. Cl. 47—41.12
11 Claims

ABSTRACT OF THE DISCLOSURE

A water-filled, water-retentive material packaged in a readily-puncturable plastic film and in a cardboard box having a large opening therein is stapled to one end of a cardboard cut flower box. Cut flowers are individually placed in the cut flower box with their cut stems punctured through the plastic film and lodged in the water-filled material to maintain the flower stems spaced and wetted. The plastic film forms a seal around the flower stems substantially preventing escape of water from the flower base.

---

This invention relates to a cut flower package and more particularly to cut flower boxes and flower base inserts therefor for maintaining cut flowers fresh before and during delivery from a retail florist to a customer's home. However, as will become apparent, the invention is not necessarily so limited.

Cut flowers are usually packaged by retail florists in simple, elongate, cardboard cut flower boxes with lids. Although the flowers may be fresh when first packaged, the cut ends of the stems often dry up and substantially prevent water flow into the stems by the time the flowers arrive at the customer's home. This is a special problem at holiday rush periods when the retail florist may package flowers a day or two in advance of delivery. Knowledgeable customers again cut the stems along an oblique line and place the newly cut stems into warm water to soften up the lower ends of the stems and replenish them with water so that the flowers will remain fresh. However, florists often meet with the complaint that delivered cut flowers wilt quickly. The customer, therefore, assumes that the flowers were not fresh when packaged. On occasion, the delay in delivery may render it impossible to maintain the flowers fresh so that even the cutting and the placing of the flowers in warm water will not keep the flowers from rapidly wilting.

Various compositions soaked in water and a preservative are commonly used by florists to maintain the freshness of floral displays in the shop. These compositions, generally called "floral foams," are capable of retaining a considerable quantity of water. Floral foam may be made of various cellular or fibrous materials. United States Pat. No. 2,416,136 issued to Alfred E. Arlington on Feb. 18, 1947, is an example of such a material. A similar material is taught in the Vernon L. Smithers patent, No. 2,774,187, which issued Dec. 18, 1956. As illustrated in the Smithers patent, material of this type has been used in rather elaborate packages for shipping flowers over long distances. Thus, a flower grower initially packages the flowers and sells the packages to florists who then retail them, all without direct handling of the individual flowers. Because unduly expensive and difficult to handle, such packages are not, to my knowledge, used by retail florists in packaging loose, cut flowers for over-the-counter sales or delivery to customers in the immediate vicinity.

An object of this invention is to provide an improved cut flower box retail florists which maintains flowers fresh after they are packaged by the florist until the customer has the opportunity to place the flowers in fresh water.

To accomplish this object, a flower base consisting of a brick or mass of water-filled, water-retentive cellular foam or fibrous material or the like, wrapped in a puncturable liner and housed in an outer box, is attached to one end wall of the flower box. The outer box of the flower base has a large cut out portion in one or more walls providing a passageway for inserting cut flower stems through the puncturable liner into the water-soaked brick or mass. The outer box is so designed that it may be easily attached to the cut flower box by staples or the like.

A further object of this invention is to provide a flower base so designed that it can conveniently be shipped in quantity to distributors or retail florists and inserted into cut flower boxes of a standard size.

Other objects and advantages will become apparent from the following description and the drawing in which.

Figure 3:
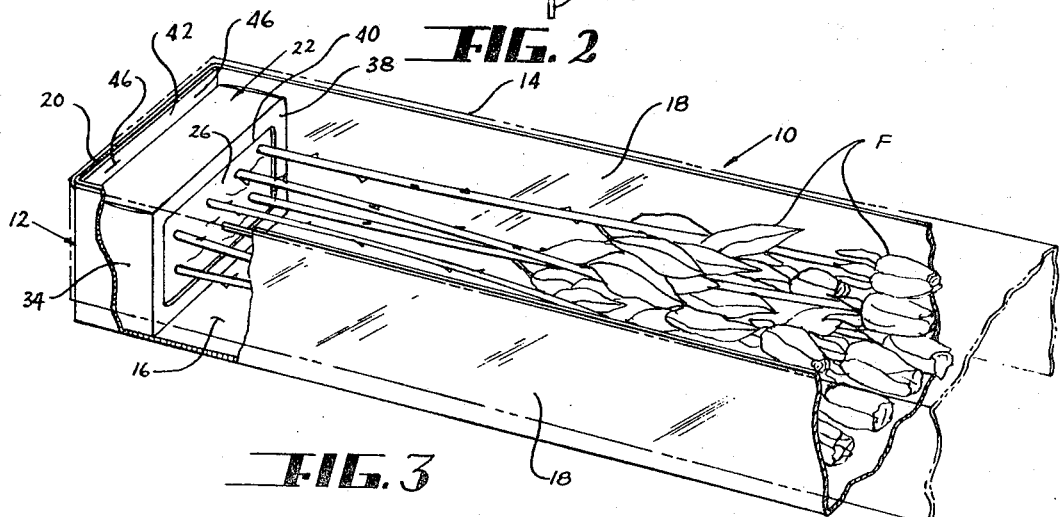
FIG. 3 is a perspective view, with parts broken away and parts shown in phantom lines, of a cut flower box provided with a flower base of the type shown in FIGS. 1 and 2.

In FIG. 3 is illustrated an elongate, cardboard cut flower box 10 having a receptacle portion 12 and a lid portion 14. The receptacle portion 12 has an elongate, rectangular bottom wall 16, a pair of elongate, rectangular side walls 18 of the same length as the bottom wall 16, and a pair of end walls 20 connected to adjacent edges of the bottom wall 16 and the side walls 18. Only one end wall 20 can be seen in the drawing. It is to be understood that the cut flower box 10 is of the conventional elongate, rectangular construction normally used by florists in packaging cut flowers for over-the-counter sales or for delivery to customers.

Figure 1:
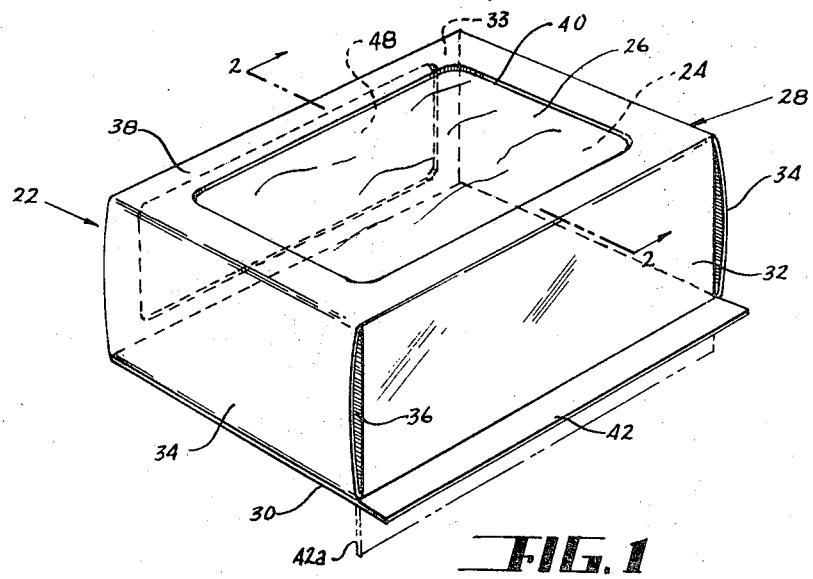
FIG. 1 is a perspective view of a flower base made in accordance with this invention and designed to be inserted into a cut flower box. The flower base is shown with its front wall uppermost in FIG. 1.
Figure 2:
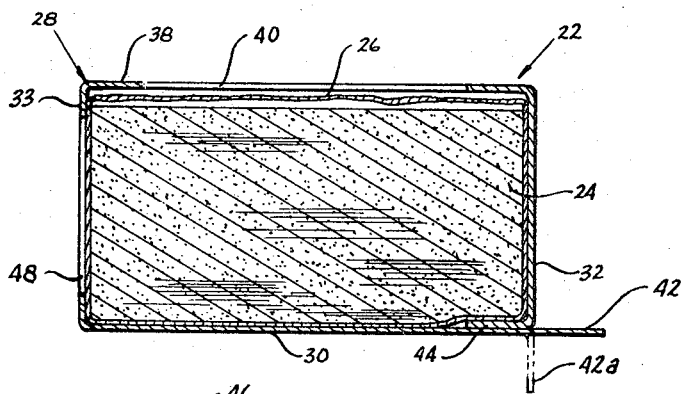
FIG. 2 is a transverse cross sectional view of the flower base of FIG. 1 as viewed in the direction of arrows 2—2 thereof.

In accordance with this invention, a flower base 22 is mounted in the flower box 10. Referring to FIGS. 1 and 2, the flower base 22 comprises a water-filled brick or mass 24 of highly water-retentive material, such as the floral foam mentioned above, wrapped in a thin-walled, water-impermeable, puncturable inner liner 26 made of plastic and housed within an outer holder or box 28. The water-filled brick or mass 24 substantially fills both the inner liner 26 and the outer box 28. The brick or mass 24 of the water-filled material, of the type described in the aforementioned patents and of the type recommended for use herewith, is self-supporting and does not crumble or flow when punctured by a cut flower stem. Thus, in addition to being capable of supplying water to cut flower stems, it will serve to maintain a spacing of the flower stems.

It will be appreciated that the plastic inner liner 26 may be made from various thermoplastic materials such as polyethylene, polypropylene or moisture-proof cellophane. For reasons discussed below, polyethylene film which is approximately 1.25 mils thick is presently preferred. The inner liner 26 can conveniently be formed from a bag or tube into which the water-filled brick or mass 24 is inserted, the bag or tube then being heat sealed at its open end or ends. So constructed, the inner liner 26 with the brick or mass 24 therein can easily and inexpensively be assembled and the brick or mass 24 will retain water over extended periods of time.

The outer box 28 of the flower base 22 may conveniently be made from a single piece of cardboard that is formed in a flat condition and folded to the rectangular shape illustrated in the drawings. FIGS. 1 and 2 most completely show the details of the outer box 28. However, the box 28 is described below as if positioned as illustrated in FIG. 3 assembled in the cut flower box 10. Thus, the outer box 28 includes a rectangular back wall 30, a pair of rectangular, parallel top and bottom walls 32 and 33, respectively, and a pair of full side flaps which form parallel side walls 34. The top wall 32 and the bottom wall 33 may have partial side flaps 36 extending from each end thereof which are folded under the full side flaps 34. The full side flaps 34 project from the ends of a rectangular front wall 38 which is parallel to the back wall 30 and most of which is cut away to form a rectangular passageway or opening of substantial area, designated 40, exposing the inner liner 26. For reasons which will become apparent, a tab 42, which is coplanar and integral with the back wall 30, projects beyond the edge of the top wall 32. As obvious, the flat blank forming the outer box 28 can readily be folded along the lines of juncture of the top wall 32 and the bottom wall 33, the back wall 30 and the front wall 38 to form the rectangular construction illustrated in FIG. 1. In FIG. 2, a connecting strip 44 is shown integral with the top wall 32 adjacent the tab 42, the connecting strip 44 being folded such as to overlie a portion of the back wall 30 and for adhesive connection thereto. It will be understood that lips or flanges (not shown) on the free ends of the full side flaps forming the side walls 34 are frictionally held between the partial side flaps 36 and the back wall 30.

As illustrated in FIG. 3, the back wall 30 and the tab 42 integral therewith are substantially coextensive with the inner face of the adjacent end wall 20 of the flower box 10. The flower base 22 is inserted in the receptacle portion 12 of the flower box 10 such that its back wall 30 is contiguous to or abutted against the end wall 20 with the free top edge of the tab 42 extending along and adjacent the free top margin of the adjacent end wall 20. Because so oriented, the tab 42 can quickly and easily be connected to the adjacent end wall 20 by staples 46 or other suitable fastening means. As an alternative to the staples 46, for example, the surface of the tab 42 engaging the inner face of the end wall 20 could be coated with a pressure sensitive adhesive.

FIG. 3 shows several flowers F in the cut flower box 10 with their stems projecting through the opening 40 and the inner liner 26 and into the water-filled brick or mass 24. As previously mentioned, the inner liner 26 is preferably made of approximately 1.25 mil polyethylene film. Film of this thickness has sufficient elasticity that a flower stem being pierced therethrough will first stretch the film yet the film ruptures without harming the cut end of the stem. The stretched film immediately surrounding the rupture point clings to the flower stems. As a practical matter, small quantities of water will flow or drip out of the water-filled brick or mass 24 into the inner liner 26. The tendency of the polyethylene film liner 26 to cling to the flower stems results in the film forming a substantially water-tight seal preventing water from escaping out of the innner liner 26 around the stems. The portion of the inner liner 26 surrounding the aforementioned seal appears to cling also to the wetted surface of the brick or mass 24, thereby to assist in maintaining the seal.

The width of the flower base 22, that is, the length of the top wall 32 plus the thickness of the side walls 34 is only slightly less than the width of the receptacle portion 12 of the cut flower box 10 and, as already noted the total area of the back wall 30 and the tab 42 of the outer box 22 is substantially coextensive with the area of the inner face of the adjacent end wall 20 of the receptacle portion 12. The full side flaps forming the side walls 34 tend to spring outwardly against the inner face of the side walls 18 of the receptacle portion 12. Accordingly, the flower base 22 fits snugly within the cut flower box 10 and with little or no tendency for it to move or pivot away from the end wall 20 about the staples 46. Because the flower base 22 is so dimensioned, there is no interference with the placing of the lid 14 over the receptacle portion 12.

It will be appreciated that flower bases 22 could be sold through ordinary channels of commerce to retail florists months in advance of their use. Because of the relative dimensions of the flower base 22 and the receptacle portion 12 of cut flower boxes 10, florists have little or no difficulty in attaching the flower base 22 into the cut flower box 10. It will also be noted that the border formed by the portion remaining of the front wall 38 surrounding the cut out portion or passageway 40 therein has no practical effect upon the number of flowers that can be placed in the cut flower box 10 because the border is located where flower stems ordinarily would not be placed. For conventional cut flower boxes 10 having an overall width of 5 inches and an overall depth of either 3½ or 4 inches, the flower base 22 desirably has a maximum dimension from side wall 34 to side wall 34 of 4½ inches, a width from top wall 32 to bottom wall 33 of 3⅛ inches, and a depth from the front wall 38 to the back wall 30 of 1⅝ inches. The tab 42 projects beyond the adjacent top wall 32 by an additional ⅜ inch. The opening 40 may be 3½ inches by 2³⁄₁₆ inches. As may be observed, the area of the opening is thus greater than half the total area of the front wall 38. Nevertheless, the portion of the front wall 38 of the flower base 22 which is not cut away forms a border around the cut out portion 40 sufficient to retain the brick or mass 24 and the inner liner 26 within the flower base 22.

In practice, the retail florist would insert individual flower stems through the passageway 40 and the puncturable inner liner 26 into the brick or mass 24, one at a time. Before or during delivery, the cut ends of the stems will constantly be supplied with water and the flowers will tend to be fresher than they would if delivered in ordinary cut flower boxes without the flower base 22. To enhance freshness, a common flower preservative could be added to the water in which the brick or mass 24 is soaked. Because of the aforementioned seal around the flower stems, the cut flower box 10 will ordinarily remain dry. After delivery, the flower stems are conveniently separated so that the customer can remove them one-by-one without having to untangle the flowers and possibly damage them.

To better avoid bruising caused by the bunching of the flowers together in the box 10, some florists may want to stagger the spacing of the cut ends of the stems from the end of the box 10. The rather shallow width of the brick or mass 24 in the box 10 as shown in FIG. 3 may not be adequate for this purpose. Accordingly, an opening or passageway 48 of substantial area may be cut in the bottom wall 33 of the outer box 28 as shown in FIGS. 1 and 2. The tab 42 can be bent as indicated at 42a in FIGS. 1 and 2 to a position coplanar with an extending behind the top wall 32. As apparent, the entire flower base 22 may be rotated from the FIGS. 1 and 2 positions and inserted in the cut flower box 10 with the flower base front wall 30 overlying the bottom wall 16 of the flower box 10 and the flower base top wall 32 abutted against the end wall 20 of the flower box 10. The tab 42 can then be stapled to the end wall 20 with the staples located slightly above the center of the end wall 20. When the base 22 is so assembled in the cut flower box 10, the passageway 48 is exposed for receiving the cut flower stems. The greater width of the brick or mass 24 in which the stems could then be inserted enables the florist to stagger them. As apparent, fewer stems can be inserted through the passageway 48 than the passageway 40. However, two flower bases 22 could be assembled on top of one another with their passageways 48 exposed in order to package more flowers with the flower stems staggered as just described.

Although the presently preferred embodiment of this invention has been described, it will be understood that various changes may be made therein within the scope of the appended claims.

Having thus described my invention, I claim:

1. A cut flower base adapted to be inserted in one end of a cut flower box to retain flowers fresh during delivery comprising a thin-walled, elastic, easily-puncturable and water-impermeable plastic film liner, a mass of water-filled, water-retentive material completely enclosed within and substantially filling said plastic liner, and a generally rectangular outer box housing said liner and said mass and substantially filled by said mass, said outer box having larger, mutually parallel front and back walls and smaller, mutually parallel top and bottom walls and further having a first opening of substantial area in said front wall exposing said liner and said outer box having a second opening of substantial area exposing said liner, said second opening being located in one of said smaller top and bottom walls of said box, whereby cut flower stems may be inserted through either of said first and said second openings and pierced through said liner into said mass.

2. The flower base of claim 1 wherein each of said openings occupies an area at least as great as one-half the area of the said wall in which it is located.

3. A cut flower base comprising a thin-walled, easily-puncturable and water-impermeable plastic liner, a mass of water-filled, water-retentive material enclosed within and substantially filling said plastic liner and an outer box substantially filled by said mass, said outer box having parallel top and bottom walls, parallel side walls, a back wall, and a front wall parallel to said back wall, said front wall having an opening of substantial area therein exposing said liner, said liner being sufficiently elastic that it clings to a flower stem pierced therethrough to form a seal restricting the escape of water around said stem, and a tab coplanar with said back wall extending between said side walls and projecting beyond said top wall for use in attaching said flower base to the inside of a cut flower box.

4. The flower base of claim 3 wherein an additional opening of substantial area exposing said liner is located in said bottom wall and said tab is bendable to a position coplanar with said top wall.

5. The flower base of claim 3 wherein an additional opening of substantial area exposing said liner is located in one of said top and bottom walls of said outer box.

6. A cut flower package comprising: an elongate cut flower box having an end wall; a flower base within said cut flower box and adjacent said end wall, said flower base comprising an outer box, a thin-walled, easily-puncturable and water-impermeable plastic liner within said outer box, and a mass of water-filled, water-retentive material enclosed within and substantially filling said plastic liner and said outer box, said outer box having an opening in one wall thereof of substantial area exposing said plastic liner whereby a cut flower stem may be pierced through said plastic liner into said mass; and means including a tab coplanar with the back wall of said outer box connecting said flower base to said flower box.

7. The package of claim 6 wherein the outermost free edge of said tab is substantially coextensive with the top margin of said end wall and contiguous therewith.

8. The package of claim 6 wherein said back wall of said outer box and said tab are substantially coextensive with the inner face of said end wall of said cut flower box and said flower base fits snugly within said cut flower box.

9. The package of claim 6 wherein said means connecting said flower base to said flower box further includes at least one staple.

10. A cut flower package comprising: an elongate cut flower box including a cut flower receptacle having elongate rectangular bottom and side walls, and at least one end wall; and a flower base within said cut flower base adjacent said end wall, said flower base comprising an outer box snugly received within said cut flower box and connected to said cut flower box adjacent said end wall, a thin-walled elastic, easily-puncturable and water-impermeable plastic film liner within said outer box, and a mass of water-filled, water-retentive material completely enclosed within and substantially filling said plastic liner, said outer box having a front wall which is substantially parallel to and spaced from said end wall and having an opening of substantial area therein for exposing said liner whereby the stem of a flower to be packaged within said cut flower box may be inserted through said opening and pierced through said plastic liner and received by said mass.

11. The package of claim 10 wherein said opening in said front wall of said outer box occupies an area at least as great as one-half the area of said front wall.

References Cited

UNITED STATES PATENTS

| 1,159,338 | 11/1915 | Potter | 47—37UX |
| 1,923,677 | 8/1933 | Lovett | 47—34.11 |
| 2,416,136 | 2/1947 | Arlington | 47—41.12 |
| 2,774,187 | 12/1956 | Smithers | 47—41.12 |
| 2,830,405 | 4/1958 | Nydegger | 47—34.11 |
| 3,201,900 | 8/1965 | King | 47—41.12 |

ROBERT E. BAGWILL, Primary Examiner

PO-1050
(5/69)

UNITED STATES PATENT OFFICE
CERTIFICATE OF CORRECTION

Patent No. 3,552,059             Dated   January 5, 1971

Inventor(s)   Burt D. Moore

It is certified that error appears in the above-identified patent and that said Letters Patent are hereby corrected as shown below:

Column 1, line 70, after "box" and before "retail" insert --for--.

Column 4, line 55, "an" should be --and--.

Column 6, line 22, "base" (second occurrence) should be ---box---.

Signed and sealed this 27th day of April 1971.

(SEAL)
Attest:

EDWARD M. FLETCHER, JR.
Attesting Officer

WILLIAM E. SCHUYLER, JR
Commissioner of Patents